Jan. 6, 1925.
J. W. SOMERVILLE ET AL
1,521,723
FAUCET
Filed Dec. 31, 1923
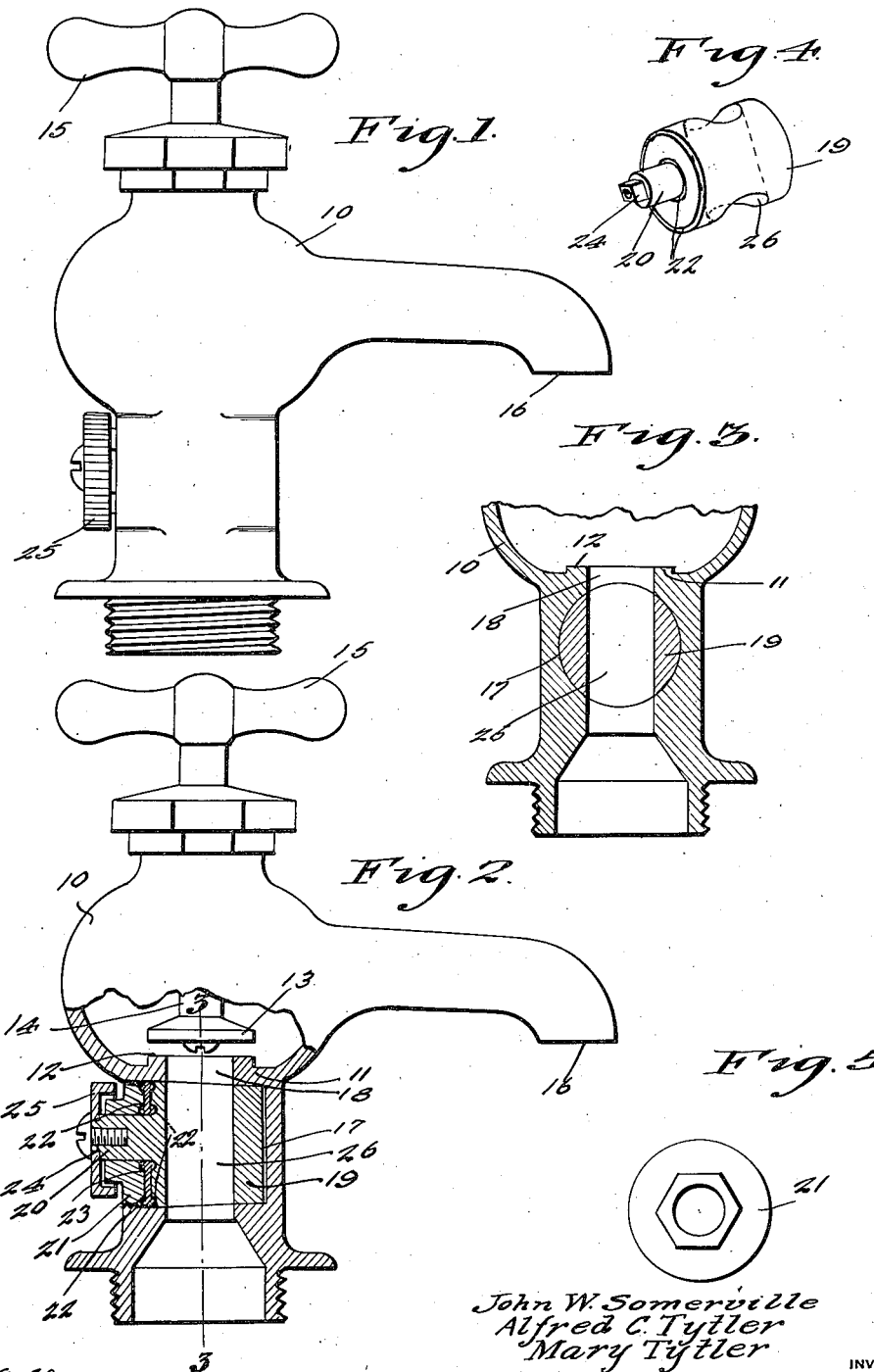
John W. Somerville
Alfred C. Tytler
Mary Tytler
INVENTOR
BY Victor J. Evans
ATTORNEY Patented Jan. 6, 1925.

1,521,723

UNITED STATES PATENT OFFICE.

JOHN W. SOMERVILLE, ALFRED C. TYTLER, AND MARY TYTLER, OF SANTA CRUZ, CALIFORNIA.

FAUCET.

Application filed December 31, 1923. Serial No. 683,751.

*To all whom it may concern:*

Be it known that we, JOHN W. SOMERVILLE, ALFRED C. TYTLER, and MARY TYTLER, citizens of the United States, residing at Santa Cruz, in the county of Santa Cruz and State of California, have invented new and useful Improvements in Faucets, of which the following is a specification.

This invention relates to faucets and is an improvement upon the subject matter disclosed in application numbered 657,171, filed Aug. 31, 1923, by A. C. Tytler and J. W. Somerville.

Like the invention disclosed in the above application, the present invention aims to provide a faucet having auxiliary means for controlling the discharge of liquid therethrough, so that the faucet may be repaired without cutting off the supply of water or other fluid to faucets connected with the same source of supply.

In addition however, the present invention aims to provide auxiliary controlling means which may be included in faucets of any type so that the field of usefulness of the invention is materially increased.

Further, the invention aims to provide novel means for packing the auxiliary controlling means so that objectionable leaking and waste will be prevented.

With the above and other objects in view, the invention further includes the following novel features and details of construction, to be hereinafter more fully described, illustrated in the accompanying drawings and pointed out in the appended claim.

In the drawings:—

Figure 1 is a side elevation of a faucet constructed in accordance with the invention.

Figure 2 is a similar view partly in section.

Figure 3 is a sectional view on the line 3—3 of Figure 2.

Figure 4 is a detail perspective view of the valve member of the auxiliary controlling means.

Figure 5 is a detail view of the plug.

Referring to the drawings in detail wherein like characters of reference denote corresponding parts, the improved faucet comprises a body 10 which may be of any desired character or design and which includes a partition 11 having a valve seat 12 which is adapted to receive a valve member or head 13 located at the inner end of a stem 14. This stem carries a handle or grip 15 and constitutes a service valve for controlling the discharge of liquid through the mouth 16 of the faucet.

Included in the body 10 is an auxiliary valve chamber 17 which extends transversely of an opening 18 provided in the partition 11 and through which water or other liquid is adapted to pass before reaching the discharge mouth 16. The chamber 17 is substantially cylindrical being slightly tapered for the reception of a similarly shaped valve member 19. This member is provided with a stem 20 which extends through an opening provided in a plug 21. This plug closes one end of the chamber 17 and acts to hold the valve member 19 in place. The adjacent faces of the plug and valve member 19 are provided with concentrically arranged annular grooves 22, the grooves of the valve member 19 being directly opposite the grooves of the plug 21. A flexible or pliable washer 23 is positioned between this plug and the valve member 19 and when the plug is screwed into position the displaced material of the washer enters the opposed grooves 22 and provides a leak-proof joint.

The plug 21 is provided with a rectangular extension or nut 24' by means of which the said plug is screwed into position and secured upon the outer end of the stem 20 over this rectangular portion 24 is a substantially dish-shaped knob 25 whose periphery is knurled or serrated as shown so as to provide convenient means for operating the valve member 19. This valve member is provided with an opening 26 which extends transversely therethrough and is adapted to be moved into and out of register with the passage through the valve body 10 so as to regulate the passage of liquid through the faucet.

By cutting off the passage to the opening 18 of the partition 11 by the operation of the valve member 19, the packing ordinarily provided upon the head 13 of the service valve may be renewed, or other repairs or adjustments made without cutting off the supply of water or liquid from other faucets connected with the source of supply.

The invention is susceptible of various changes in its form, proportions and minor details of construction and the right is herein reserved to make such changes as properly fall within the scope of the appended claim.

Having described the invention what is claimed is:—

An auxiliary apertured valve member positioned transversely within the inlet port of a faucet, said valve member being slightly tapered for proper reception within a valve seat therein, a stem projecting from the outer end of the valve member and having a squared apertured head thereon, a centrally apertured plug extending over the stem and threaded within the side of the faucet, the adjacent faces of the plug and valve member having concentrically arranged annular grooves therein, a flexible washer positioned within said grooves, a substantially dish-shaped knurled knob positioned over the squared head of the stem, and means for adjustably securing the knob to the stem.

In testimony whereof we affix our signatures.

JOHN W. SOMERVILLE.
ALFRED C. TYTLER.
MARY TYTLER.